No. 811,494. PATENTED JAN. 30, 1906.
F. A. FREEMAN.
FASTENING DEVICE.
APPLICATION FILED FEB. 9, 1905.
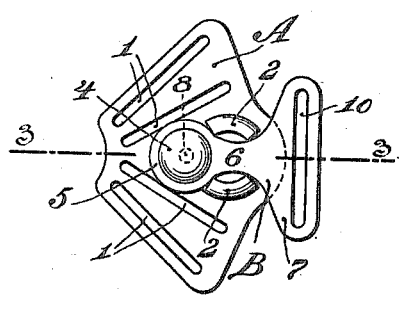
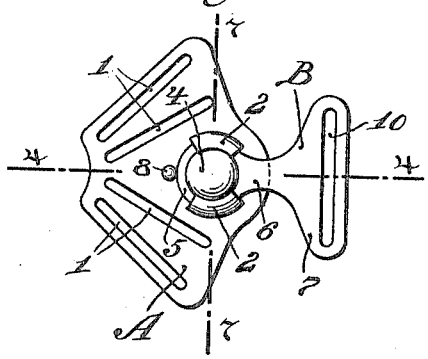
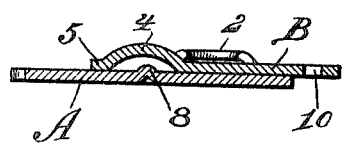
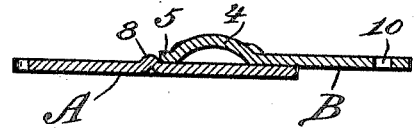
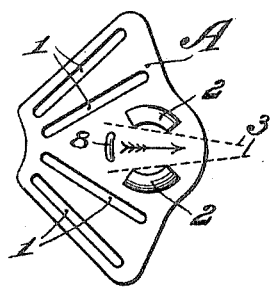
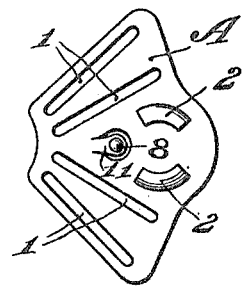
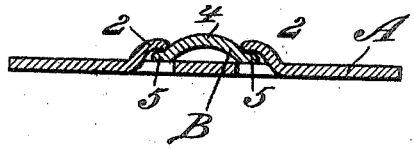
Witnesses:
Jas. C. Wobensmith
Mae Hofmann
Inventor:
Frank A. Freeman
By Jno. Towardale his
Attorney

UNITED STATES PATENT OFFICE.

FRANK A. FREEMAN, OF PHILADELPHIA, PENNSYLVANIA.

FASTENING DEVICE.

No. 811,494.      Specification of Letters Patent.      Patented Jan. 30, 1906.

Original application filed April 1, 1904, Serial No. 201,063. Divided and this application filed February 9, 1905. Serial No. 244,861.

*To all whom it may concern:*

Be it known that I, FRANK A. FREEMAN, a citizen of the United States, residing at Philadelphia, in the county of Philadelphia and State of Pennsylvania, have invented a new and useful Fastening Device, of which the following is a specification.

My invention relates to fastening devices, said devices being especially adapted for use in connection with hose-supporters.

The object of my invention is to afford neat, simple, and efficient fastening means the coöperating parts or members of which shall be readily and surely brought into the operative position of engagement and so that the same shall be safely maintained in said coöperative position until manually operated.

It is also my object to provide such a device which shall lie flat and smooth when in the operative position.

This application is a division of my application filed April 1, 1904, having Serial No. 201,063, upon which was issued Patent No. 789,723, dated May 16, 1905.

I accomplish my object by the mechanism illustrated in the accompanying drawings, in which—

Figure 1 is a plan view of my two coöperating members in the preliminary position of engagement. Fig. 2 is a similar view of said two members in the final position of engagement. Fig. 3 is a cross-section on line 3 3 of Fig. 1. Fig. 4 is a cross-section on line 4 4 of Fig. 2. Fig. 5 is a plan view showing a modification in form of locking projection. Fig. 6 is a similar view showing a further modification of the locking projection. Fig. 7 is a cross-section on line 7 7 of Fig. 2.

Similar characters refer to similar parts throughout the several views.

The member A is in the form of a flat piece provided with slots 1 for engaging the web or garter to which it is attached. The segmental lips 2 are struck up slightly from said member A and are oppositely disposed and symmetrical with respect to each other. The lines intersecting the two ends of the arc-shaped margins of these lips 2 are slightly convergent, as indicated by the dotted lines 3 in Fig. 5. The member B has a similar slot 10 for engagement with the web and a flattened concavo-convex head 4 with a flat circular margin 5. The sides of this concavo-convex head are adapted to pass under the lips 2 of member A from the broader opening and to be drawn toward said lips in the direction of the arrow shown in Fig. 5. The lips, as shown in the drawings, are segmental in form and also concavo-convex to conform with the contour of the concavo-convex head 4. It follows from the formation of the coöperating parts, as above described, that, due to the spring of the metal of plate A, said lips 2 are usually sufficient to maintain said head in engagement therewith when the head is drawn under the same as far as it is possible to draw it in view of the relative convergence of said lips.

The neck 6, joining the head part 4 of member B with the loop part 7, is slightly less in extension than the narrower space between the ends of the lips 2. The margins of lips 2 are in the arcs approximately of the same circle which corresponds to the portion of the sphere formed by the convexed head 4 of member B. From this construction a certain free relative rotative movement is permitted between members A and B while said head 4 is held in engagement with the lips 2. It also follows that the proportions of head 4 with its margin 5 and the proportions and positions of the lips 2 are such that while the head may be readily sprung beneath the lips through the wider opening therebetween it is prevented from being drawn free from the lips in the direction of the arrow. This is because of the more contracted opening between said lips being insufficient to permit the head from passing therethrough. As above stated, the spring of the plate A and lips 2 is sufficient to maintain the head 4 in the operative position when it has been snapped beneath the lips; but it is safer to provide a stop to prevent the accidental disengagement of said two members, and the special object of this invention is to provide such stop, which shall in no way impair the strength or detract from the appearance of the device, which shall be efficient to prevent accidental disengagement, which shall permit the rotative movement desirable between such two members, and which shall not interfere with the convenient and sure engagement of one member with the other when drawing the same from the preliminary to the final position. To this end I provide the stop or projection 8, struck up from said member A and adapted to lie just without the margin 5 of the head 4 of member B when said members are in the final operative position. By placing the stop or projection 8 as shown in the drawings it will be seen that the strength of the member A is in no wise impaired. The relative rotative movement between members A and B is not interfered with, and the engagement between said members is not interfered with, because, as will be seen by an inspection of Figs. 1 and 3, when the member B is placed over member A, with the narrow neck 6 lying between the lips 2, the concave portion of head 4 will lie over the projection 8. This permits the member B to lie perfectly flat upon member A as the same is being drawn into the final position of engagement with member A, and the margin 5 of member B will be drawn sufficiently under the lips 2 before the head is caused to rise as it passes over the projection 8. This serves to prevent the projection 8 from causing the head to slip over or above the lips 2. After the margin 5 becomes engaged under lips 2 it is obvious that two members can be pulled to the final position, no matter what the pressure exerted between the under side of the margin and the projection 8. The head once engaged under the lips cannot escape therefrom, and by pulling the two members to the final position the head snaps over projection 8 into place, where it is securely held until sufficient pressure is exerted in the opposite direction to cause the head to spring back over the projection.

Fig. 5 shows a modification of the form of stop or projection 8, while Fig. 6 shows such a projection 8 placed upon a resilient tongue 11, stamped out of the metal plate A. This tongue obviously adds to the ease or facility with which the members may be snapped into the final position and disengaged from said final position.

What I claim is—

1. In a fastening device, the combination of two interlocking members, one member having a flattened circular concavo-convex head, the other member provided with oppositely-disposed arc-shaped lips, the one symmetrical with the other, for engaging said head therebetween, and a projection on the flat surface of the lip member approximately between the receiving ends of the lips and outside the margin of the head when in final position, said projection so located as to lie within the concave portion of the head until the same has been brought into preliminary engagement with the lips.

2. In a fastening device, the combination of two interlocking members, one member having a flattened circular concavo-convex head, the other member provided with oppositely-disposed convergent arc-shaped lips, the one symmetrical with the other, for engaging said head therebetween, and a projection on the flat surface of the lip member approximately between the receiving ends of the lips and outside the margin of the head when in final position, said projection so located as to lie within the concave portion of the head until the same has been brought into preliminary engagement with the lips.

3. In a fastening device, the combination of two interlocking members, one member having a flattened circular concavo-convex head, the other member provided with oppositely-disposed arc-shaped lips, the one symmetrical with the other, for engaging said head therebetween, a resiliently-mounted projection on the flat surface of the lip member approximately between the receiving ends of the lips and outside the margin of the head when in final position, said projection so located as to lie within the concave portion of the head until the same has been brought into preliminary engagement with the lips.

FRANK A. FREEMAN.

Witnesses:
HERBERT C. RUSSELL,
HOWARD S. OKIE.